(12) United States Patent
Kwak

(10) Patent No.: US 10,723,335 B2
(45) Date of Patent: Jul. 28, 2020

(54) SOLENOID VALVE FOR BRAKE SYSTEM

(71) Applicant: MANDO CORPORATION, Pyeongtaek-si, Gyeonggi-do (KR)

(72) Inventor: Sung Ho Kwak, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 126 days.

(21) Appl. No.: 16/008,552

(22) Filed: Jun. 14, 2018

(65) Prior Publication Data
US 2018/0362005 A1 Dec. 20, 2018

(30) Foreign Application Priority Data

Jun. 14, 2017 (KR) .......................... 10-2017-0075063
Jan. 11, 2018 (KR) .......................... 10-2018-0003858
Jan. 15, 2018 (KR) .......................... 10-2018-0005087

(51) Int. Cl.
*B60T 8/36* (2006.01)
*F16K 27/02* (2006.01)
(Continued)

(52) U.S. Cl.
CPC ............ *B60T 8/3685* (2013.01); *B60T 8/363* (2013.01); *B60T 13/662* (2013.01);
(Continued)

(58) Field of Classification Search
CPC ...... B60T 8/363; B60T 13/662; B60T 13/686; F16K 15/185; F16K 27/029; F16K 31/0651; F16K 31/0658; F16K 31/0675
(Continued)

(56) References Cited

U.S. PATENT DOCUMENTS

| | | | | |
|---|---|---|---|---|
| 6,092,781 A | * | 7/2000 | Hohl ...................... | B60T 8/363 251/129.02 |
| 6,846,408 B2 | * | 1/2005 | Knight .................. | B60T 8/3615 137/550 |
| 2009/0121541 A1 | * | 5/2009 | Lee ......................... | B60T 8/363 303/119.2 |

FOREIGN PATENT DOCUMENTS

| | | |
|---|---|---|
| JP | 2004-340325 A | 12/2004 |
| KR | 10-2002-0007613 A | 1/2002 |

(Continued)

OTHER PUBLICATIONS

Korean Office Action dated Aug. 22, 2018, issued in corresponding Korean Patent Application No. 10-2017-0075063.

*Primary Examiner* — Angelisa L. Hicks
(74) *Attorney, Agent, or Firm* — Hauptman Ham, LLP

(57) ABSTRACT

Disclosed is a solenoid valve for a brake system. The solenoid valve comprises an armature disposed inside a sleeve to open and close an orifice formed in a seat by moving up and down along an axial direction together with a plunger; an elastic member for providing an elastic force to the armature; a magnet core accommodating the seat therein and providing a driving force to the armature in a direction opposite to the elastic force of the elastic member; a seal stopper coupled to a lower side of the magnet core so as to communicate with the orifice and having a slot on an outer circumferential surface thereof to allow the flow of a fluid through the slot; an outlet filter forming an outer flow passage with the seal stopper; an inlet filter coupled to a lower side of the seal stopper; a lip seal fitted between the seal stopper and the inlet filter and having an inclined protruding portion to allow only one-way flow of the fluid; an orifice flow passage opened and closed by the up and down movement of the armature; and a one-way flow passage formed to include a mesh portion of the outlet filter, (Continued)

a gap formed between a modulator block and the lip seal due to a deformation of the lip seal, and a mesh portion of the inlet filter, wherein the inlet filter includes a protruding portion inclined outwardly so as to have a chamber therein, and the lip seal is provided so that the inside thereof can be inserted into the chamber.

5 Claims, 4 Drawing Sheets

(51) Int. Cl.
    *F16K 31/06*     (2006.01)
    *F16K 15/18*     (2006.01)
    *B60T 13/66*     (2006.01)
    *B60T 13/68*     (2006.01)
    *H01F 7/08*     (2006.01)

(52) U.S. Cl.
CPC .......... *B60T 13/686* (2013.01); *F16K 15/185* (2013.01); *F16K 27/029* (2013.01); *F16K 31/0651* (2013.01); *F16K 31/0658* (2013.01); *F16K 31/0675* (2013.01); *B60T 8/365* (2013.01); *H01F 7/081* (2013.01); *H01F 2007/086* (2013.01)

(58) Field of Classification Search
USPC .................................................. 251/129.15
See application file for complete search history.

(56) References Cited

FOREIGN PATENT DOCUMENTS

KR     10-2011-0023271 A     3/2011
KR     10-2015-0106048 A     9/2015

* cited by examiner

SOLENOID VALVE FOR BRAKE SYSTEM

CROSS-REFERENCE TO RELATED APPLICATION(S)

This application is based on and claims priority under 35 U.S.C. § 119 to Korean Patent Application No. 10-2017-0075063, filed on Jun. 14, 2017, Korean Patent Application No. 10-2018-0003858, filed on Jan. 11, 2018, and Korean Patent Application No. 10-2018-0005087, filed on Jan. 15, 2018 in the Korean Intellectual Property Office, the disclosures of which are incorporated by reference herein in their entirety.

BACKGROUND

1. Technical Field

The present disclosure relates to a solenoid valve for a brake system that prevents a slip phenomenon between a wheel and a road surface when a vehicle starts suddenly, thereby allowing the vehicle to start smoothly.

2. Description of the Related Art

Among brake systems for a vehicle, there is an anti-lock brake system (hereinafter, referred to as 'ABS') that periodically interrupts braking pressure transmitted to wheels to prevent the wheels from slipping on a road surface.

The ABS for a vehicle includes an NO (Normally Open) type solenoid valve installed on a hydraulic line connected to a wheel cylinder on a wheel side from a master cylinder and an NC (Normally Closed) type solenoid valve installed on a return line for returning a fluid from the wheel cylinder on the wheel side.

The ABS also includes a hydraulic pump for re-pressurizing the fluid returning from the wheel cylinder to generate braking pressure, and a low pressure accumulator and a high pressure accumulator installed upstream and downstream of the hydraulic pump to compress the circulating fluid, respectively.

The operation of these devices is controlled by an ECU (Electric Control Unit; not shown). The ECU controls the opening and closing of the NO type and NC type solenoid valves to interrupt the braking pressure supplied to the wheel side, and at the same time, controls the driving of the hydraulic pump to re-pressurize the fluid returned along the hydraulic line to the wheel side so that intermittent braking can be performed.

In addition to the basic configuration of the ABS described above, a recently developed ABS for a vehicle further includes a brake traction control system (BTCS) which prevents a slip phenomenon between a wheel and a road surface when the vehicle starts suddenly, thereby allowing the vehicle to start smoothly.

In a general traction control system, a separate solenoid valve for traction control (hereinafter, referred to as 'solenoid valve for TC') is installed on a hydraulic line connecting an outlet side of a master cylinder and an outlet side of a high pressure accumulator, a separate first bypass passage for connecting the hydraulic line of the outlet side of the master cylinder and a hydraulic line of an inlet side of a hydraulic pump and a separate second bypass passage for connecting from the outlet side of the high pressure accumulator to the outlet side of the master cylinder are provided, a reciprocating type hydraulic valve is installed on the first bypass passage, and a pressure regulating valve is installed on the second bypass passage.

In general, the solenoid valve for TC includes, as main components, an armature for opening and closing an orifice, an elastic member for providing an elastic force to the armature, a magnet core for providing a driving force to the armature in a direction opposite to the elastic force of the elastic member, a seal stopper communicating with the orifice and coupled to the magnet core, an outlet filter for forming an outer flow passage between the outlet filter and the seal stopper, an inlet filter coupled to the seal stopper, and a lip seal fitted between the seal stopper and the inlet filter.

When a high-temperature brake fluid passes through the solenoid valve for TC, an outer circumferential surface of the seal stopper manufactured by plastic injection may be permanently deformed due to thermal expansion. That is, a flow passage toward a wheel cylinder from a master cylinder is formed between the outer circumferential surface of the seal stopper and an inner circumferential surface of a modulator block, and there is a problem in that the flow passage may be reduced by the above-mentioned shape deformation. Further, as the temperature of the brake fluid gradually decreases, the viscosity of the fluid increases.

Further, when the brake fluid passes through the solenoid valve for TC, the viscosity of the fluid gradually increases due to the ambient temperature. Accordingly, the lip seal made of ethylene propylene rubber is subjected to an external force by the high-viscosity fluid.

Conventionally, since a portion of the inlet filter disposed at a lower portion of the lip seal has a flat shape, when the lip seal receiving fluid resistance comes into contact with the flat lower portion of the inlet filter, the lip seal is forced to be compressed in the axial direction.

That is, due to the fluid resistance force, the lip seal contacted with the flat lower portion of the inlet filter is pressed in the axial direction, and at the same time, a shape change occurs in which the lip seal spreads in the radial direction.

SUMMARY

It is an aspect of the present disclosure to provide a solenoid valve for a brake system capable of simultaneously performing a flow rate control function by an electromagnetic force and a check valve function for securing a flow rate at the time of emergency braking.

Further, it is an aspect of the present disclosure to provide a solenoid valve for a brake system capable of transferring a fluid from a master cylinder to a wheel cylinder even if a permanent shape deformation of a seal stopper occurs.

Additional aspects of the present disclosure will be set forth in part in the description which follows and, in part, will be obvious from the description, or may be learned by practice of the disclosure.

In accordance with one aspect of the present disclosure, there may be provided a solenoid valve for a brake system comprising: an armature disposed inside a sleeve to open and close an orifice formed in a seat by moving up and down along an axial direction together with a plunger; an elastic member for providing an elastic force to the armature; a magnet core accommodating the seat therein and providing a driving force to the armature in a direction opposite to the elastic force of the elastic member; a seal stopper coupled to a lower side of the magnet core so as to communicate with the orifice and having a slot on an outer circumferential surface thereof to allow the flow of a fluid through the slot;

an outlet filter forming an outer flow passage with the seal stopper; an inlet filter coupled to a lower side of the seal stopper; a lip seal fitted between the seal stopper and the inlet filter and having an inclined protruding portion to allow only one-way flow of the fluid; an orifice flow passage opened and closed by the up and down movement of the armature; and a one-way flow passage formed to include a mesh portion of the outlet filter, a gap formed between a modulator block and the lip seal due to a deformation of the lip seal, and a mesh portion of the inlet filter, wherein the inlet filter includes a protruding portion inclined outwardly so as to have a chamber therein, and the lip seal is provided so that the inside thereof can be inserted into the chamber.

An upper end portion of the outlet filter may be in close contact with the magnet core and a lower end portion of the outlet filter may be in close contact with the modulator block, and the one-way flow passage may be formed to include the outer flow passage formed between the outlet filter and the seal stopper.

The seal stopper may include an upward protruding portion forming the outer flow passage with the outlet filter, and a seat fastening portion to which an inner circumferential surface of the seat is coupled.

The seal stopper may include a lateral protruding portion which is supported by an inclined surface of the modulator block to restrict a downward movement and maintains spacing with the modulator block, and the one-way flow passage may be formed to include a gap between the seal stopper and the modulator block.

The inlet filter may include an inner press-fit portion to press-fit the seal stopper, and a lower end of a protruding portion of the inlet filter may be supported by the modulator block to prevent separation from the seal stopper.

A mesh portion may be provided in the outer flow passage on the one-way flow passage and an inner flow passage on the orifice flow passage.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
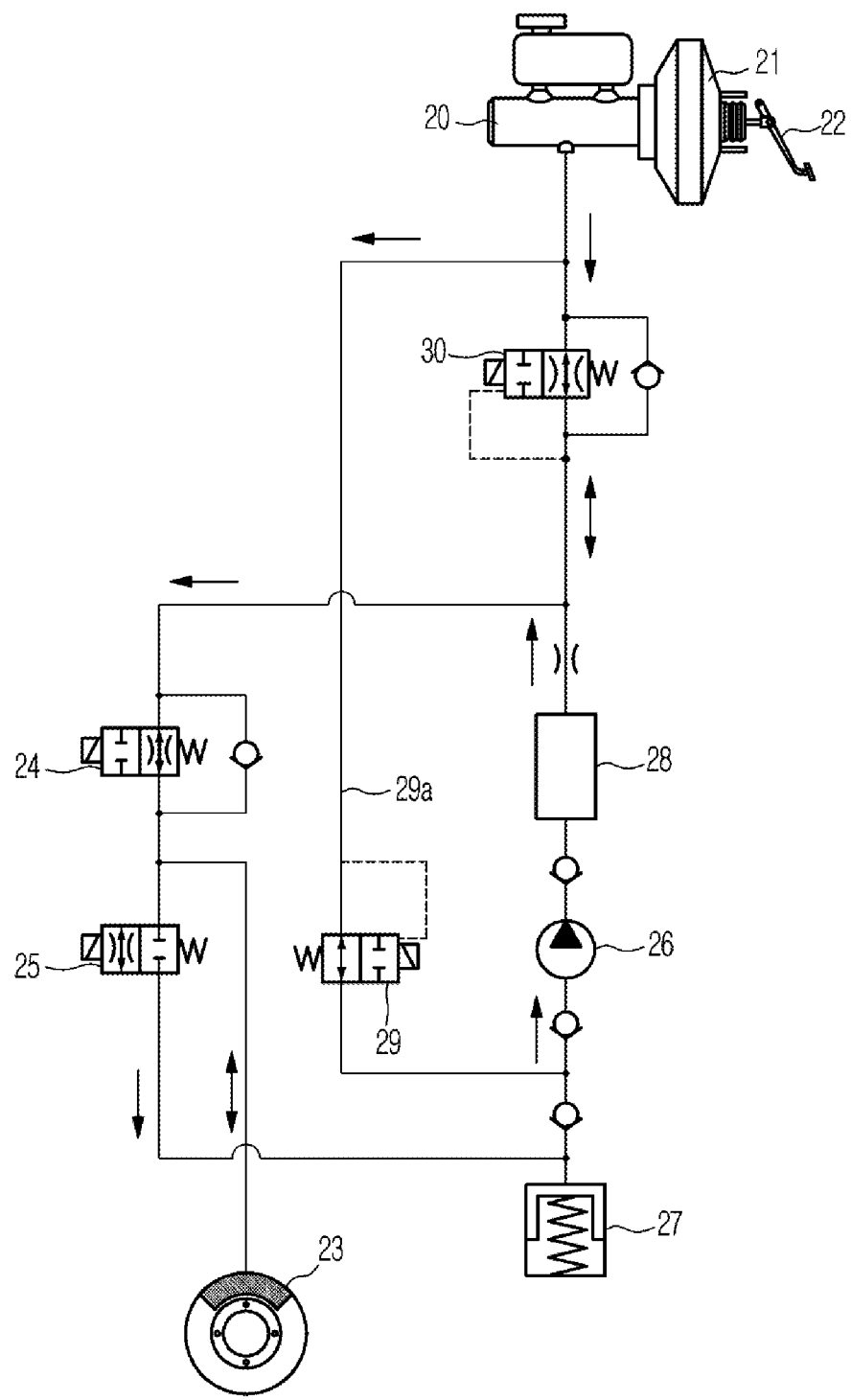
FIG. 1 is a hydraulic circuit diagram of an anti-lock brake system including a solenoid valve for a conventional traction control system.

FIG. 1 is a hydraulic circuit diagram of an anti-lock brake system (ABS) including a solenoid valve for a conventional traction control system. Referring to FIG. 1, an ABS for a vehicle to which the present disclosure is applied includes an NO (Normally Open) type solenoid valve 24 installed on a hydraulic line connected to a wheel cylinder 23 on a wheel side from a master cylinder 20 to open and close a supply flow passage and an NC (Normally Closed) type solenoid valve 25 to open and close a flow passage for returning a fluid from the wheel cylinder 23 on the wheel side.

When the NO type solenoid valve 24 is open, the NC type solenoid valve 25 is closed so that braking pressure is applied to the wheel side, and when the NO type solenoid valve 24 is closed, the NC type solenoid valve 25 is opened so that the braking pressure applied to the wheel side is released.

The ABS includes a hydraulic pump 26 for re-pressurizing the fluid returning from the wheel cylinder 23 to an upstream side of the NO type solenoid valve 24, and a low pressure accumulator 27 and a high pressure accumulator 28, which form a buffer space, are provided upstream and downstream of the hydraulic pump 26.

The low pressure accumulator 27 provided on upstream of the hydraulic pump 26 functions to temporarily store the brake fluid returning from the wheel cylinder 22 and supply the brake fluid to the hydraulic pump 26, and the high pressure accumulator 28 provided downstream of the hydraulic pump 26 functions to attenuate the pressure pulsation due to the operation of the hydraulic pump 26 while the fluid pressurized by the hydraulic pump 26 is temporarily stored. The operation of these devices is controlled by an ECU (Electric Control Unit) (not shown).

The ECU controls the NO type and NC type solenoid valves 24 and 25 so that the flow passage connected to the wheel cylinder 23 is opened and closed, and controls the driving of the hydraulic pump 26 to re-pressurize the fluid returned to the low pressure accumulator 27 through a return flow passage toward the wheel cylinder 22, thereby intermittently braking.

The ABS is equipped with a brake traction control system (BTCS) that prevents a vehicle from slipping between wheels and a road surface at the start of the vehicle so that the vehicle can start smoothly.

The brake traction control system has a separate hydraulic line 29a connecting a hydraulic line at an outlet side of the master cylinder 20 and a hydraulic line at an inlet side of the hydraulic pump 26. The hydraulic line 29a is provided with a reciprocating hydraulic valve 29 of a normally open type which is closed to block the flow passage when a driver depresses a brake pedal 22 so as to transmit a hydraulic pressure. This is to cause braking pressure to be transmitted only to the wheel side of a vehicle when a driver depresses the brake pedal 22 normally.

Further, in the brake traction control system, a solenoid valve 30 of a normally open type for TC is provided on the hydraulic line connecting the outlet side of the master cylinder 20 and the outlet side of the high pressure accumulator 28, which is closed to block the flow passage when a slip is generated between a wheel and a road surface due to the sudden start or the like of a vehicle so that the braking pressure generated by the driving of the hydraulic pump 26 is transmitted to the wheel side.

The solenoid valve 30 for TC is a NO valve that opens the flow passage and closes the flow passage normally when receiving an electric signal, and a check valve may be provided in parallel with the solenoid valve 30 so that unidirectional fluid transfer from the master cylinder 20 to the wheel cylinder 23 is possible.

Figure 2:
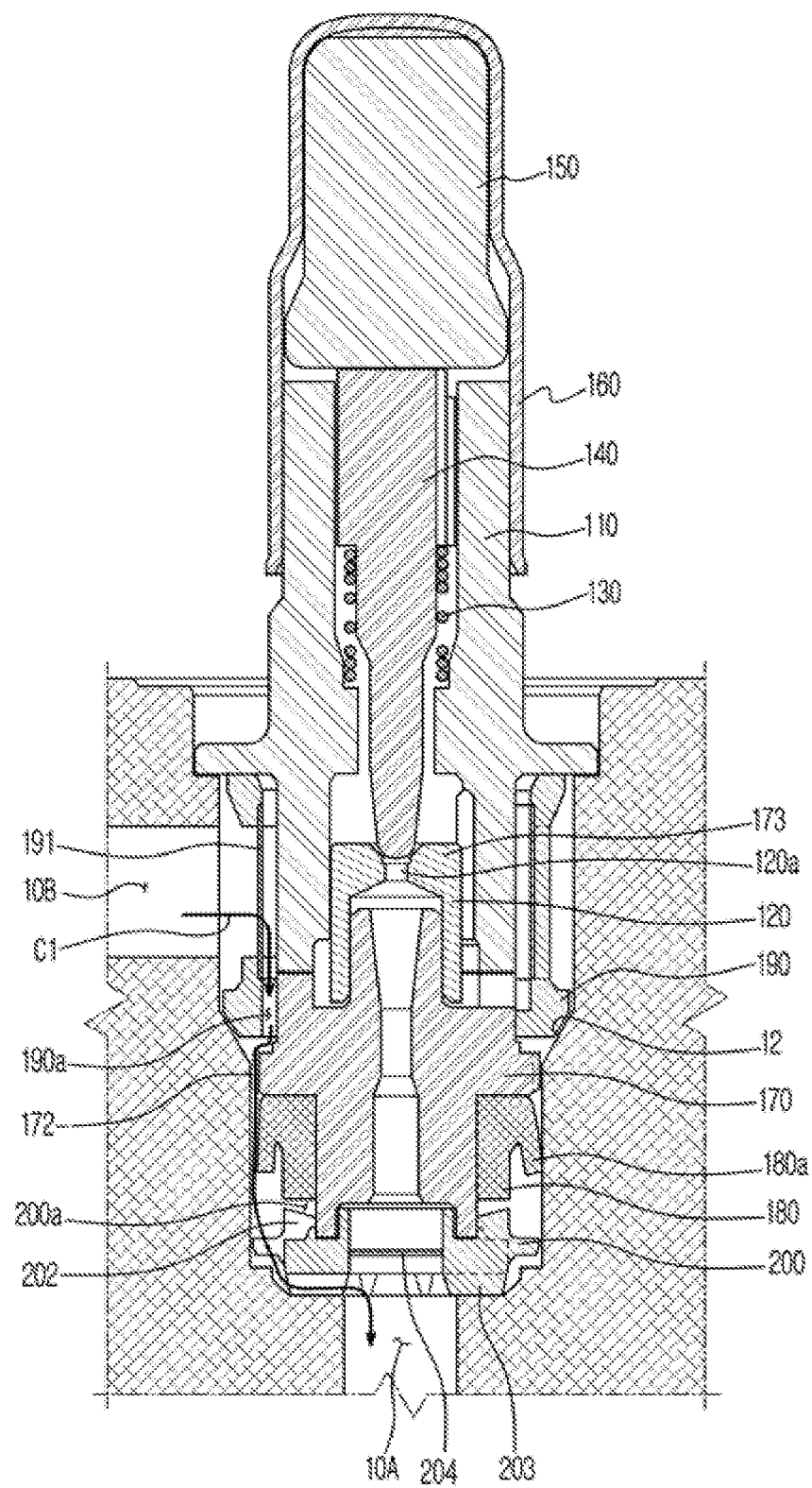
FIG. 2 is a cross-sectional view of a solenoid valve for a brake system according to an embodiment of the present disclosure.
Figure 3:
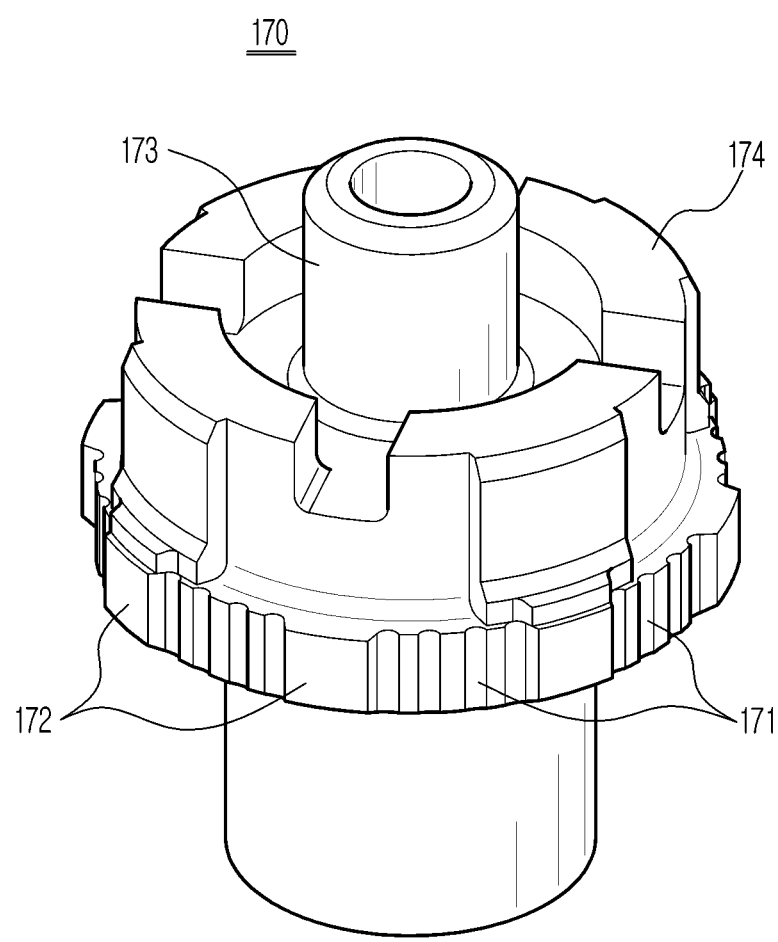
FIG. 3 is a perspective view of a seal stopper according to an embodiment of the present disclosure.
Figure 4A:
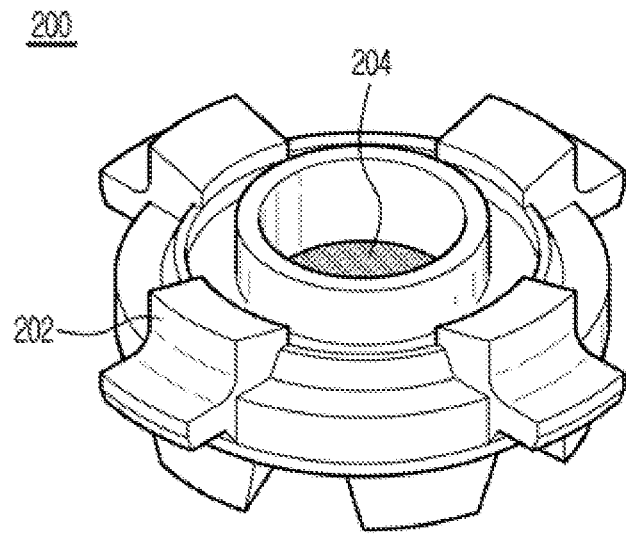
FIG. 4A is a perspective view of an upper portion of an inlet filter according to an embodiment of the present disclosure.
Figure 4B:
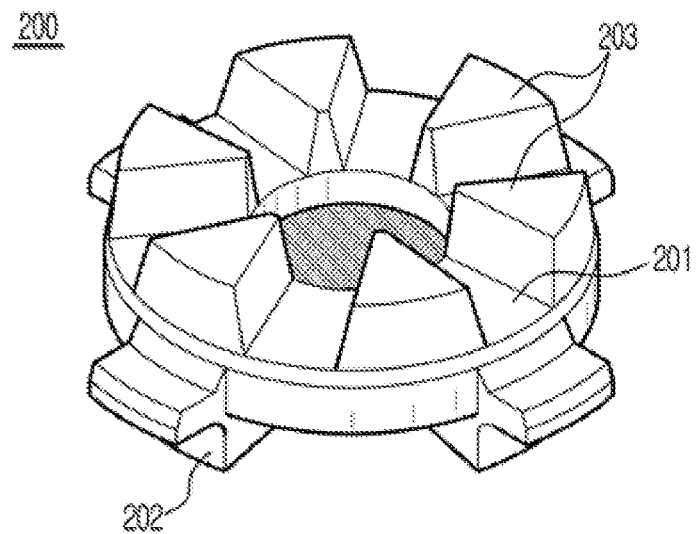
FIG. 4B is a perspective view of a lower portion of the inlet filter according to an embodiment of the present disclosure.

FIG. 2 is a cross-sectional view of a solenoid valve 100 for a brake system according to an embodiment of the present disclosure, FIG. 3 is a perspective view of a seal stopper 170 according to an embodiment of the present disclosure, and FIGS. 4A and 4B are perspective views of an upper portion and a lower portion of an inlet filter 200 according to an embodiment of the present disclosure, respectively.

Referring to the FIGS. 1 to 4A, 4B the solenoid valve 100 is press-fitted into a bore of a modulator block 10 to simultaneously perform the function of the conventional solenoid valve 30 for TC and the function of the check valve arranged in parallel thereto as shown in FIG. 1. The solenoid valve 100 simultaneously has a flow rate control configuration by an electromagnetic force and a check valve configuration for securing a flow rate at the time of CBS emergency braking.

The solenoid valve 100 includes an armature 150 disposed inside a sleeve 160 to open and close an orifice 120a formed in a seat 120 by moving up and down along an axial direction together with a plunger 140, an elastic member 130 to provide an elastic force to the armature 150, a magnet core 110 accommodating the seat 120 therein and providing a driving force to the armature 150 in a direction opposite to the elastic force of the elastic member 130, the seal stopper 170 coupled to a lower side of the magnet core 110 so as to communicate with the orifice 120a and having a slot 171 on an outer circumferential surface thereof to allow the flow of a fluid through the slot 171, an outlet filter 190 forming an outer flow passage 190a with the seal stopper 170, the inlet filter 200 coupled to a lower side of the seal stopper 170, and a lip seal 180 fitted between the seal stopper 170 and the inlet filter 200 and having an inclined protruding portion 180a to allow only one-way flow of the fluid.

The solenoid valve 100 further includes an orifice flow passage, and a one-way flow passage C1 passing through a mesh portion 191 of the outlet filter 190 and a gap between the modulator block 10 and the lip seal 180. The solenoid valve 100 may regulate a flow rate flowing through the flow passage connecting a first port 10A and a second port 10B by opening and closing the orifice 120a with the armature 150 which is moved up and down by the magnet core 110.

The magnet core 110 is coupled to an opened lower portion of the sleeve 160 in the form of being press-fitted or being welded to close the lower portion of the sleeve 160. Although not shown, for a more rigid coupling between the magnet core 110 and the sleeve 160, the magnet core 110 and the sleeve 160 may be assembled by forming a coupling groove in the magnet core 110 and inserting the sleeve 160 into the coupling groove. With this coupling structure, the coupling between the sleeve 160 and the magnet core 110 may be facilitated and the coupling process may also be simplified compared to the conventional welding method.

The sleeve 160 is coupled to the magnet core 110 by being press-fitted or welded and accommodates the armature 150 therein, and guides movement of the armature 150 only in the longitudinal direction by restraining movement of the armature 150 in the width direction.

The seat 120 may be press-fitted into a hollow portion provided in the magnet core 110. The plunger 140, which will be described later, may regulate a flow rate of the fluid passing through the orifice 120a by opening or closing the orifice 120a provided in the seat 120.

The armature 150 is installed in the sleeve 160 so as to be movable upward and downward, and may have a shape corresponding to the sleeve 160. The plunger 140 contacting the seat 120 is disposed at a lower end of the armature 150.

That is, the plunger 140 extends from the lower end of the armature 150 toward the seat 120, and may be formed with a step portion so as to receive an elastic force from the elastic member 130 supported by the magnet core 110.

The seal stopper 170 includes an upward protruding portion 174 forming the outer flow passage 190a between the seal stopper 170 and the outlet filter 190, and a seat fastening portion 173 to which the inner circumferential surface of the seat 120 is coupled. The seat fastening portion 173 may protrude upward so as not to be separated from the inner circumferential surface of the seat 120.

The seal stopper 170 further includes a lateral protruding portion 172 which is supported by an inclined surface 12 of the modulator block 10 to restrict a downward movement and maintains spacing with the modulator block 10. The one-way flow passage C1 may include a flow passage formed by a gap between the modulator block 10 and the lateral protruding portion 172 of the seal stopper 170.

For example, the eight lateral protruding portions 172 may be provided over the outer circumferential surface of the seal stopper 170.

The brake fluid passing through the above-described flow passages is exposed under a high temperature condition, and thus permanent shape deformation may occur in the outer circumferential surface of the seal stopper 170 manufactured by plastic injection.

As a result of increasing the outer diameter of the seal stopper 170 due to the shape deformation, a gap flow passage between the modulator block 10 and the seal stopper 170 is reduced, which may cause a delay in the flow of the fluid.

Accordingly, as shown in FIG. 3, the seal stopper 170 according to an embodiment of the present disclosure has the slot 171 on the outer circumferential surface thereof, even if the gap flow passage between the seal stopper 170 and the modulator block 10 is reduced due to the outer diameter expansion of the seal stopper 170, the flow of the fluid through the slot 171 becomes possible.

The lateral protruding portion 172 prevents distortion that may occur in the assembling process or the component itself and allows a uniform flow rate to flow through the lip seal 180 to prevent damage or permanent deformation of the lip seal 180. Further, the lateral protruding portion 172 may prevent the lip seal 180 from being caught between the seal stopper 170 and the modulator block 10 when pressure is applied from a lower side of the lip seal 180.

The lip seal 180 may be provided at the lower side of the seal stopper 170, the inclined protruding portion 180a may be provided at an outer side of the lip seal 180, and the one-way flow passage C1 may be composed of the outer flow passage 190a provided in the outlet filter 190, a gap flow passage between the inclined protruding portion 180a and the modulator block 10, and an outer flow passage 201 of the inlet filter 200.

The lip seal 180 is attached to the outer circumferential surface of a small-diameter portion formed at a lower side of the seal stopper 170 and has the inclined protruding portion 180a which is inclined and protrudes outwardly to be deformed by a pressure difference, thereby allowing only unidirectional flow of a fluid. That is, when the pressure in the second port 10B is larger than the pressure in the first port 10A, the inclined protruding portion 180a is bent in a contracting direction to open the one-way flow passage C1, but in contrast, when the pressure in the first port 10A is larger than the pressure in the second port 10B, the inclined protruding portion 180a is bent in an expanding direction to close the one-way flow passage C1.

The outlet filter 190 includes the mesh portion 191 disposed so as to face the second port 10B and an outer flow passage 190a formed between the seal stopper 170 and the outlet filter 190, and may be installed to surround the outer circumferential surface of the magnet core 110. In addition, an upper end portion of the outlet filter 190 is in close contact with the magnet core 110 and a lower end portion of the outlet filter 190 is in close contact with the modulator block 10.

The outlet filter 190 may be provided, for example, in such a shape that the upper part and the lower part are symmetrical.

Referring to FIGS. 4A and 4B, the inlet filter 200 includes a mesh portion 204 disposed to face the first port 10A to prevent foreign substances from entering and a protruding portion 202 contacting the modulator block 10 laterally. The protruding portion 202 may restrain the lip seal 180 together with the seal stopper 170 to restrict the movement of the lip seal 180 during the pressure action.

The protruding portion 202 is formed to be inclined toward the outside and a chamber 200a may be provided inside the protruding portion 202.

When the lip seal 180 contacts the inlet filter 200, the inside of the lip seal 180 may be inserted into the chamber 200a, thereby minimizing the radial spreading of the lip seal 180.

The inlet filter 200 may be provided with a support portion 203 protruding downward to maintain spacing with the modulator block 10 and to secure a flow passage.

An inner press-fit portion (not shown) is provided on the inner circumferential surface of the inlet filter 200 so that the seal stopper 170 disposed at the upper portion of the inlet filter 200 may be press-fitted.

A lower end of the protruding portion 202 of the inlet filter 200 is supported by the modulator block 10 to prevent separation from the seal stopper 170. That is, a lower portion of the seal stopper 170 is fixed by the inlet filter 200, thereby preventing separation of the seal stopper 170 due to vibration or shaking.

By combining the above-described components organically, the solenoid valve 100 according to an embodiment of the present disclosure may be provided with two flow passages, that is, the flow passage of the orifice 120a which is opened and closed by moving the armature 150 up and down and the one-way flow passage C1 through the lip seal 180.

The flow passage of the orifice 120a may be closed by the operation of the valve in a normally open state. That is, when electric power is applied to the magnet core 110, the armature 150 is moved downward by a magnetic force generated from the magnet core 110 to push the plunger 140 downward, and thus the plunger contacts the orifice 120a while compressing the elastic member 130, thereby blocking the flow of the fluid through the orifice 120a, the seal stopper 170, and the inlet filter 200.

The one-way flow passage C1 that functions as a check valve allows only one-way flow from the second port 10B to the first port 10A. That is, the one-way flow passage C1 may include a flow passage on which the mash portion 191 is disposed, the outer flow passage 190a formed between the outlet filter 190 and the seal stopper 170, the gap flow passage formed between the seal stopper 170 and the modulator block 10, the gap flow passage formed between the outer circumferential surface of the inclined protruding portion 180a and the modulator block 10, and the outer flow passage 201 formed in the inlet filter 200 so that the one-way flow passage C1 may be connected to the master cylinder 20 through the second port 10B and connected to the wheel cylinder 23 through the first port 10A. At this time, when the pressure in the second port 10B is relatively larger than that in the first port 10A, the lip seal 180 may be bent inward to implement a check valve function.

The inlet filter 200 may include the mesh portion 204 on the outer flow passage 201 and the inner flow passage, and the mesh portion 204, for example, may be disposed at a center portion of the inlet filter 200. Accordingly, foreign substances may be prevented from entering the lip seal 180 from the first port 10A connected to the wheel cylinder 23 and leakage due to damage of the lip seal 180 may be prevented. That is, foreign substances may be prevented from entering the master cylinder 20 from the wheel cylinder 23 or the wheel cylinder 23 from the master cylinder 20 by installing filters on the inlets and outlets of the one-way flow passage C1 and the flow passage in the orifice 120a, respectively.

In other words, in the prior art, fluid from the first port 10A communicating with the master cylinder 20 to the lip seal 180 does not pass through a filter. However, according to the present disclosure, since fluid flows to the lip seal 180 after passing through the mesh portion 191 of the outlet filter 190, foreign substances are prevented from entering the lip seal 180 side from the master cylinder 20. At this time, the upper end of the outlet filter 190 may be in close contact with the magnet core 110 and the lower end of the outlet filter 190 may be in close contact with the modulator block 10 to prevent foreign substances from entering.

In addition, in the prior art, a mesh portion is provided at the front of the inlet filter so that the fluid that has passed through the lip seal passes through the mesh portion of the inlet filter. However, in the present disclosure, the mesh portion 204 is provided at the center of the inlet filter 200 so that the fluid that has passed through the lip seal 180 may not necessarily pass through the mesh portion 204.

As is apparent from the above, the solenoid valve according to an embodiment of the present disclosure is provided with two flow passages, that is, the flow passage of the orifice which is opened and closed by moving the armature up and down and the one-way flow passage through the lip seal, so that the solenoid valve can simultaneously perform a flow rate control function by an electromagnetic force and a check valve function for securing a flow rate at the time of CBS emergency braking.

Further, the seal stopper of the solenoid valve according to an embodiment of the present disclosure is provided with a slot on the outer periphery thereof to flow a fluid, so that a flow delay of the fluid can be prevented in advance by the movement of the fluid through the slot even if the flow passage between the seal stopper and the modulator block is reduced due to a shape deformation of the seal stopper.

Further, the lip seal of the solenoid valve according to an embodiment of the present disclosure minimizes the change in a radial shape thereof by being fitting into a chamber formed inside the protruding portion of the inlet filter, so that a flow delay of a fluid can be prevented in advance even if the flow passage between the lip seal and the regulator block is reduced due to the change in the radial shape of the lip seal.

Further, the seal stopper of the solenoid valve according to an embodiment of the present disclosure includes an upward protruding portion forming an outer flow passage with the outlet filter and a seat fastening portion to which an inner circumferential surface of the seat is coupled, the seal stopper is press-fitted into an inner press-fit portion provided at an upper portion of the inlet filter, and a lower portion of the inlet filter is supported by the modulator block, so that the ease of assembly can be improved.

Further, the seal stopper of the solenoid valve according to an embodiment of the present disclosure includes a lateral protruding portion which is supported by an inclined surface of the modulator block to restrict a downward movement and maintains spacing with the modulator block, and the one-way flow passage includes a gap flow passage formed between the seal stopper and the modulator block by the lateral protruding portion, so that damage or permanent deformation of the lip seal can be prevented by preventing distortion that may occur in the assembling process or the component itself and allowing a uniform flow rate to flow through the lip seal.

Further, the solenoid valve according to an embodiment of the present disclosure includes a mesh portion as a single filter body provided in the outlet filter and the inlet filter, respectively, to remove foreign substances contained in the fluid flowing through the orifice flow passage and the one-way flow passage, so that the foreign substances contained in the fluid introduced to the single mesh portions from both the orifice flow passage and the one-way flow passage can be completely removed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A solenoid valve for a brake system comprising:
   an armature disposed inside a sleeve to open and close an orifice formed in a seat by moving up and down along an axial direction together with a plunger;
   an elastic member for providing an elastic force to the armature;
   a magnet core accommodating the seat therein and providing a driving force to the armature in a direction opposite to the elastic force of the elastic member;
   a seal stopper coupled to a lower side of the magnet core so as to communicate with the orifice and having a slot on an outer circumferential surface thereof to allow the flow of a fluid through the slot;
   an outlet filter forming an Outer flow passage with the seal stopper;
   an inlet filter coupled to a lower side of the seal stopper;
   a lip seal fitted between the seal stopper and the inlet filter and having an inclined protruding portion to allow only one-way flow of the fluid;
   an orifice flow passage opened and closed by the up and down movement of the armature;
   a one-way flow passage formed to include a mesh portion of the outlet filter, a gap formed between a modulator block and the lip seal due to a deformation of the lip seal,
   and a mesh portion of the inlet filter, wherein the inlet filter includes a protruding portion inclined outwardly so as to have a chamber therein, and the lip seal is provided so that the inside thereof can be inserted into the chamber;
   wherein an upper end portion of the outlet filter is in close contact with the magnet core and a lower end portion of the outlet filter is in close contact with the modulator block, and the one-way flow passage is formed to include the outer flow passage formed between the outlet filter and the seal stopper;
   wherein the seal stopper includes an upward protruding portion forming the outer flow passage with the outlet filter, and a seat fastening portion to which an inner circumferential surface of the seat is coupled.

2. The solenoid valve according to claim 1, wherein the seal stopper includes a lateral protruding portion which is supported by an inclined surface of the modulator block to restrict a downward movement and maintains spacing with the modulator block, and the one-way flow passage is formed to include a gap between the seal stopper and the modulator block.

3. The solenoid valve according to claim 1, wherein the inlet filter includes an inner press-fit portion to press-fit the seal stopper, and a lower end of a protruding portion of the inlet filter is supported by the modulator block to prevent separation from the seal stopper.

4. The solenoid valve according to claim 1, wherein a mesh portion is provided in the outer flow passage on the one-way flow passage and an inner flow passage on the orifice flow passage.

5. The solenoid valve according to claim 1, wherein the inlet filter includes a protruding portion inclined outwardly so as to have a chamber therein.

* * * * *